United States Patent

Krikorian et al.

[11] Patent Number: 5,742,250
[45] Date of Patent: Apr. 21, 1998

[54] ENHANCED BEAMSPLITTING TECHNIQUE FOR USE WITH THREE-DIMENSIONAL SYNTHETIC ARRAY RADAR

[75] Inventors: Kapriel V. Krikorian, Agoura; Robert A. Rosen, Agoura Hills, both of Calif.

[73] Assignee: Raytheon Company, Lexington, Mass.

[21] Appl. No.: 705,436

[22] Filed: Aug. 29, 1996

[51] Int. Cl.$^6$ ........................................... G01S 13/90
[52] U.S. Cl. ................................................... 342/25
[58] Field of Search ........................... 342/25, 74, 81, 342/146

[56] References Cited

U.S. PATENT DOCUMENTS 5,473,331  12/1995  Kennedy et al. ................ 342/25

Primary Examiner—Daniel T. Pihulic
Attorney, Agent, or Firm—Glenn H. Lenzen, Jr.; Leonard A. Alkov

[57] ABSTRACT

A data processing method for use in processing synthetic array radar data to more accurately steer its antenna toward a target. A radar signal is transmitted, and sum and difference channel synthetic array radar maps derived from the transmitted radar signal are formed. A target cell within the synthetic array radar maps is designated, and a window surrounding the target cell is defined. Discriminant values for each of the cells within the window are computed that comprise the difference channel value divided by the sum channel value for each cell. A best fit line through the computed discriminant values is then computed. A null cell where the discriminant value defined by the best fit line is equal to zero is determined. Then, the radar signal is steered so that the null cell coincides with the designated target cell.

2 Claims, 2 Drawing Sheets

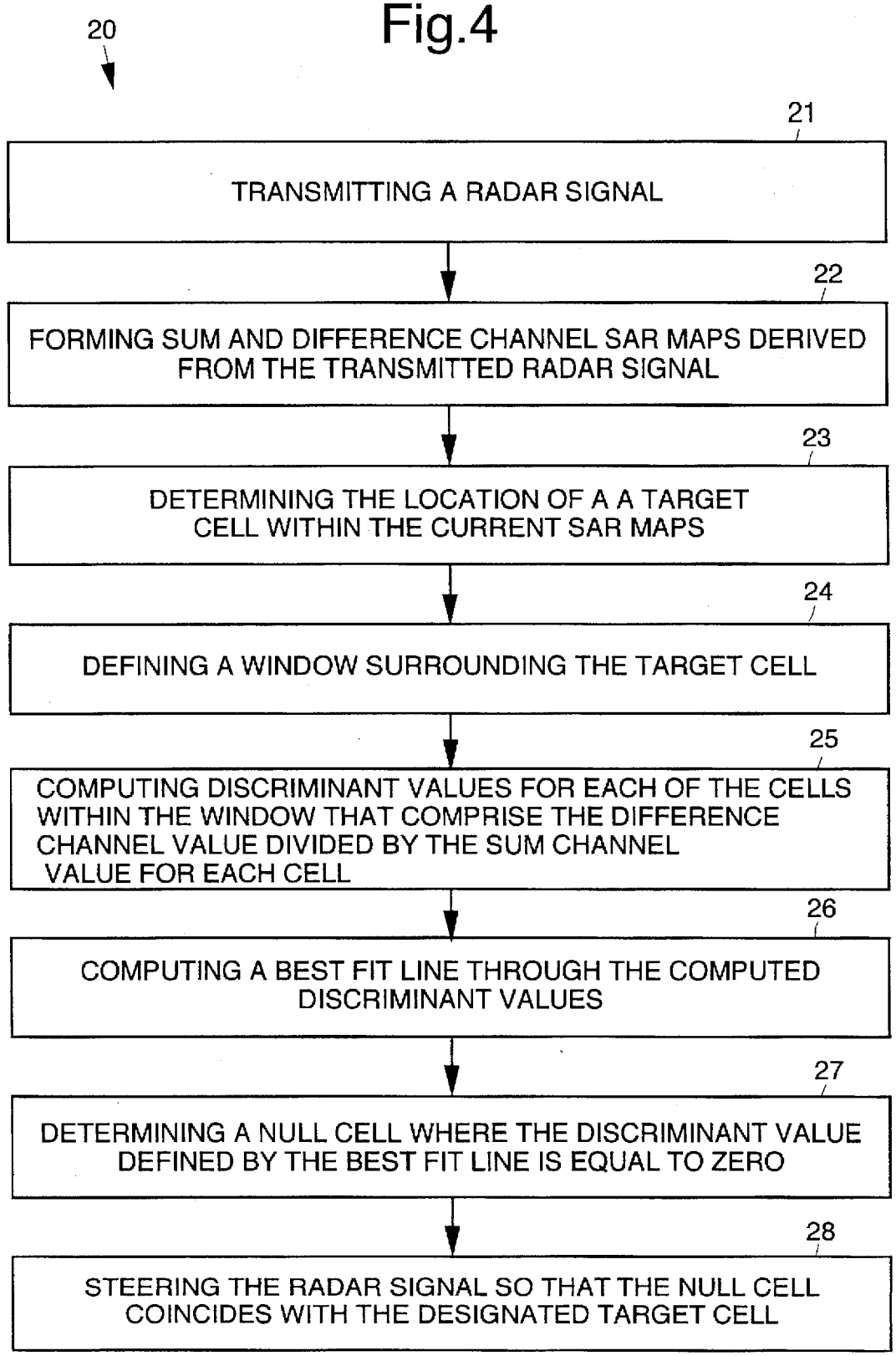

ENHANCED BEAMSPLITTING TECHNIQUE FOR USE WITH THREE-DIMENSIONAL SYNTHETIC ARRAY RADAR

BACKGROUND

The present invention relates generally to synthetic array radar, and more particularly, to a beamsplitting technique and data processing method for use with a three-dimensional synthetic array radar.

Although synthetic array radars (SAR) used on aircraft provide a precise image of a target scene, they do not provide a direct measurement of the three-dimensional location of a target. The location of the target must be inferred from a SAR map produced by the synthetic array radar based on ownship velocity and height of the aircraft above the target. In synthetic array radars employed in aircraft, and the like, inertial beam pointing errors and ownship velocity and height errors adversely affect targeting accuracies of the radars. Thus, errors in these parameters as well as inertial beam pointing errors, cause errors in the location of the target relative to the null in the antenna beam produced by the radar. The present invention is particularly adapted to eliminate these errors.

For example, in inverse monopulse guidance systems and techniques, such as those described in U.S. Pat. No. 5,473,331, entitled "Combined SAR Monopulse and Inverse Monopulse Weapon Guidance", assigned to the assignee of the present invention, these errors could exceed beam pointing requirements. Consequently, inverse monopulse guidance systems, for example, would benefit from a data processing method or technique that would reduce inertial beam pointing errors and ownship velocity and height errors and thus improve their targeting accuracy.

Accordingly, it is an objective of the present invention to provide for a beamsplitting technique and data processing method for use with three-dimensional synthetic array radars.

SUMMARY OF THE INVENTION

To meet the above and other objectives, the present invention provides for a data processing method for use with three-dimensional synthetic array radars that greatly enhances angular location accuracies of targets detected thereby. The present data processing method forms angular discriminants of pixels surrounding a target cell in a three-dimensional synthetic array radar map to improve the angular estimate of the target.

More particularly, the data processing method comprises the following steps. A radar signal is transmitted, and sum and difference channel SAR maps derived from the transmitted radar signal are formed. A target cell within the SAR maps is designated, and discriminant values are computed. In a preferred embodiment, a window surrounding the target cell is defined and discriminant values for each of the cells within the window are computed. The discriminant values comprise the difference channel value divided by the sum channel value for each cell. A best fit line through the computed discriminant values is then computed. A null cell where the discriminant value defined by the best fit line is equal to zero is determined. Then, the radar signal is steered so that the null cell coincides with the designated target cell.

The present invention produces an optimal angular estimation of the direction to a target, thus significantly reducing errors encountered in currently used techniques. The present invention may be used to directly process transmitted difference and sum waveforms generated by the inverse monopulse system of U.S. Pat. No. 5,473,331, for example, thus eliminating sum and difference calibration errors. Furthermore, the present invention only requires a single channel receiver (sum channel). The technique and data processing method of the present invention may also be used in systems where difference channels are formed during reception rather than during transmission. The technique and data processing method of the present invention may be used in processing sum and difference patterns, funnel difference patterns, and difference patterns employing cuts. The present invention may be used when varied terrain topologies that include buildings, and the like where there is an unknown surface normal having a large angle relative to vertical. This scenario causes significant coupling between the two map coordinates and the angle discriminants.

The technique and data processing method of the present invention achieves very high beamsplitting ratios (typically greater than 50) and provides for accurate targeting when used with synthetic array radars. The term beamsplitting is used to refer to the fact that the present invention has an accuracy in determining the location of the null that is leas than the beamwidth of the antenna beam. In the case of millimeter wave radars, for example, the present technique and data processing method is crucial in overcoming inertial beam pointing errors as well as ownship velocity and height errors. Thus, the present invention significantly improves the targeting accuracy of airborne radars.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4 is a flow diagram illustrating steps in the data processing method in accordance with the present invention.

DETAILED DESCRIPTION

Figure 1:
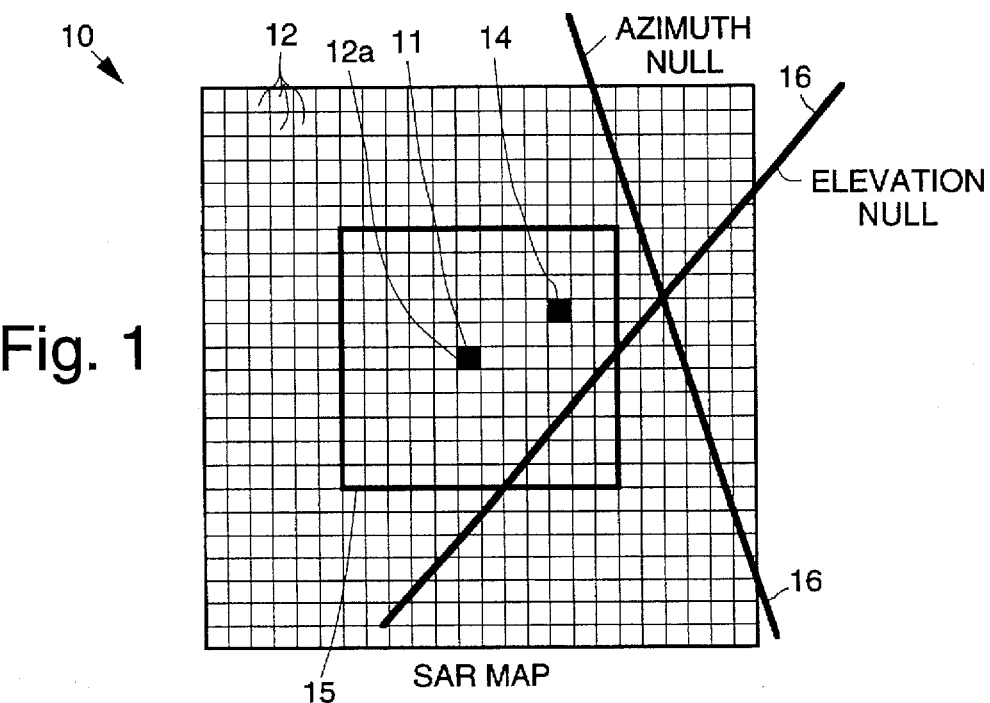
FIG. 1 shows SAR map pixels surrounding a designated target cell employed in a null location and data processing method in accordance with the principles of the present invention.
Figure 2:
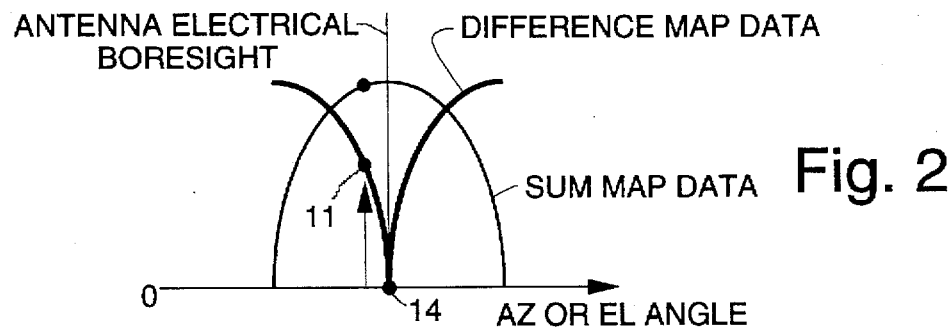
FIG. 2 is a graph of sum and difference magnitudes versus angle.
Figure 3:
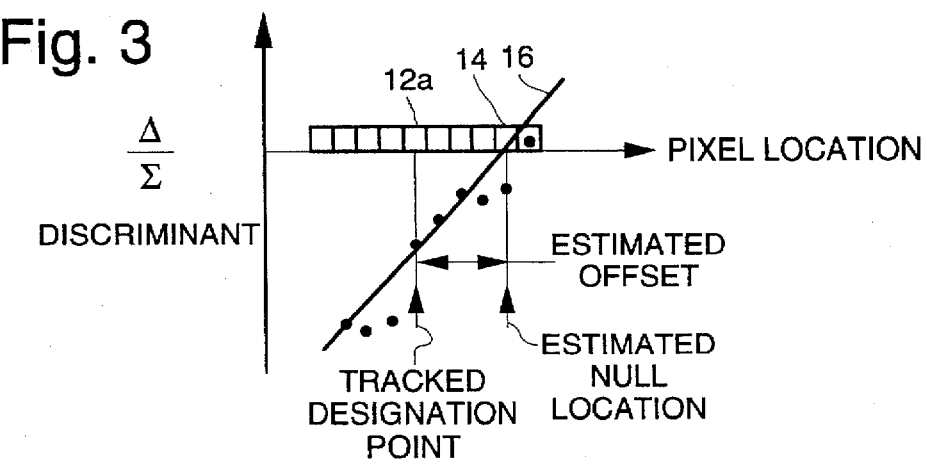
FIG. 3 is a graph of angle discriminant versus pixel index that is useful in explaining the null location technique of the present invention.

Referring to the drawing figures, FIGS. 1–3 are useful in illustrating a null location and data processing method 20 (detailed in FIG. 4) in accordance with the present invention. FIG. 1 shows SAR map 10 of pixels 12 surrounding a designated target cell 11 (or target 11) that is processed by the present null location and data processing method 20. FIG. 2 is a graph of sum and difference channel magnitudes versus angle, while FIG. 3 is a graph of angle discriminant versus pixel index.

In the present method 20, a null 14 is placed on a desired target 11 within the field of view of a radar employing the present method 20. To obtain a direct measurement of the offset of the location of the null 14 relative to the target 11, SAR mapping on transmit azimuth and elevation difference channels is employed in addition to conventional sum channel mapping. For each pixel 12 or resolution cell 12, a measure of its brightness (magnitude) is obtained from the transmit sum channel SAR map and precise azimuth and elevation angles relative to the transmit difference channel null 14 are determined from the transmit difference and sum channel SAR maps 10.

The synthetic array radar is used to illuminate an area by transmitting a radar signal. A target pixel 12a ( or target cell 11) is designated in three-dimensional SAR map 10, and azimuth and elevation channel processing is used to steer the null 14 so that it coincides with the target pixel 12a. An estimate of the transmit difference channel null location is obtained from each pixel 12 within a window 15 of pixels 12. Errors due to height variation are minimized by including only those pixels 12 in the neighborhood of the target cell 11 (within the window 15 of pixels 12). For example, five one-foot resolution pixels 12 in each direction from the target cell 11 may be used as the window 15. An angle discriminant (difference over sum channel response) is formed for each of the pixels 12 in the window 15.

The farther the pixel 12 is from the center of the null 14, the larger the magnitude of the angle discriminant. The graph of FIG. 3 shows a one-dimensional angle discriminant versus pixel index, and the zero crossing of a best fit line 16 through the angle discriminant values indicates the current position of the null 14. The best fit line 16 is determined as follows.

Let $\hat{I}$=the line of sight of the antenna and let $\overline{V}$=velocity, then $$\hat{z} = \frac{\hat{I} \times \overline{v}}{|\hat{I} \times \overline{v}|}$$

A general three-dimensional displacement from the center of the SAR map 10 with map coordinates $q_1$ and $q_2$ is described by the equation:

$$\overline{c} = q_1\overline{u}_1 + q_2\overline{u}_2 + \alpha\hat{z} \text{ where } \overline{u}_1 \cdot \hat{z} = \overline{u}_2 \cdot \hat{z} = 0.$$

Similarly, a general three-dimensional displacement with angle discriminants $d_1$ and $d_2$ is described by the equation:

$$\overline{c} = d_1\overline{b}_1 + d_2\overline{b}_2 + \beta\hat{z} \text{ where } \overline{b}_1 \cdot \hat{z} = \overline{b}_2 \cdot \hat{z} = 0.$$

Let $$q_i = \begin{bmatrix} q_{i1} \\ q_{i2} \end{bmatrix}$$

be the map coordinate of cell i and $$d_i = \begin{bmatrix} d_{i1} \\ d_{i2} \end{bmatrix}$$

be the measured discriminates for cell i. Let $w_1$ be the weight for cell i.

Then the weighted least squares estimate for the surface normal $\overline{n}$ is given by $$\overline{n} = \hat{z} + \gamma_1\overline{u}_1 + \gamma_2\overline{u}_2$$

where $$\begin{bmatrix} \gamma_1 \\ \gamma_2 \end{bmatrix} = \frac{1}{V^TV} U^{-1}(A^T - Q^{-1}D)V$$

$$A = B^{-1} \begin{bmatrix} \overline{u}_1\overline{b}_1 & \overline{u}_2\overline{b}_1 \\ \overline{u}_1\overline{b}_2 & \overline{u}_2\overline{b}_2 \end{bmatrix}$$

$$V = B^{-1} \begin{bmatrix} \hat{z}_1 \cdot \overline{b}_1 \\ \hat{z}_2 \cdot \overline{b}_2 \end{bmatrix}$$

$$U = \begin{bmatrix} \overline{u}_1\overline{u}_1 & \overline{u}_2\overline{u}_1 \\ \overline{u}_1\overline{u}_2 & \overline{u}_2\overline{u}_2 \end{bmatrix}$$

$$B = \begin{bmatrix} \overline{b}_1\overline{b}_1 & \overline{b}_2\overline{b}_1 \\ \overline{b}_1\overline{b}_2 & \overline{b}_2\overline{b}_2 \end{bmatrix}$$

$$Q = \sum_i (q_i - q_a)w_i(q_i - q_a)^T$$

$$D = \sum_i (q_i - q_a)w_i(d_i - d_a)^T$$

$$q_a = (\Sigma w_i)^{-1}(\Sigma w_i q_i)$$

and $$d_a = (\Sigma w_i)^{-1}(\Sigma w_i d_i).$$

The terms $\gamma_1$ and $\gamma_2$ indicated deviation of the surface from the slant plane ($\gamma_1=\gamma_2=0$ when the surface and the slant plane coincide). The 2 by 2 matrices A, U and B and the 2 by 1 vector V depend on geometry, antenna configuration and the map processing parameters. All the information from radar returns is collapsed across pixels 12 in two 2 by 2 matrices Q and D. The weight $w_i$ is derived from the sum channel and is generally set to the sum channel power in cell I. The 2 by 1 vectors $q_a$ and $d_a$ are weighted averages of the map coordinates and discriminats.

The weighted least squares estimate of the displacement of the map center from the null 14 is then $$\overline{c} = d_1\overline{b}_1 + d_2\overline{b} + ee_{\ 2} + \beta + e, cir\ z$$

where $$\begin{bmatrix} d_1 \\ d_2 \end{bmatrix} = -(A - V[\gamma_1\gamma_2]U)q_a + d_a$$

and $$\beta = \frac{-1}{\hat{I} \cdot n} d_1\overline{b}_1 \cdot n + d_2\overline{b}_2 \cdot n.$$

As an example of the calculation of the discriminants and the discriminant axis vectors $\overline{b}_1$ and $\overline{b}_2$, consider a circular electronically scanned antenna with its mechanical boresight pointing straight down, and generating a funnel difference pattern. The zero phase reference of the difference channel may be set to the projection of the line of sight on the aperture, and the angle discriminants may be calculated as $$d_1 = R_e\left(\frac{\Delta}{\Sigma}\right) \text{ and } d_2 = I_m\left(\frac{\Delta}{\Sigma}\right),$$

where $\Delta$ and $\Sigma$ are the difference and sum channel complex voltages. Then the discriminant axes are given by $$\bar{b}_2 = \hat{h}\left(\frac{r}{G}\right) \text{ and } \bar{b}_1 = \hat{l} \times \hat{h}\left(\frac{r}{g}\right)\frac{1}{|\hat{l} \cdot \hat{k}|}$$

where r is the range, $\hat{k}$ is the unit vertical, $$\hat{h} = \frac{\hat{k} \cdot \hat{l}}{|\hat{k} \cdot \hat{n}|}$$

is the ground phase unit vector perpendicular to the line of sight of he antenna, and G is the unscanned difference channel voltage gin slope relative to the sum channel gain.

As an example of the map axis vectors $\bar{u}_1$ and $\bar{u}_2$, consider a map 10 with a rectangular grid of pixels 12 on the ground plane aligned with the ground plane projection of he line of sight. Then the axes of the map 10 are given by:

$$\bar{u}_1 = \bar{q}_1 - (\hat{z} \cdot \bar{g}_1)\hat{z}$$

$$\bar{u}_2 = \bar{q}_2 - (\hat{z} \cdot \bar{g}_2)\hat{z}$$

where $$\bar{g}_1 = \hat{h} \times \hat{d}d_r$$

$$\bar{g}_2 = \hat{h}d_a$$

$d_r$ is the down range ground plane pixel spacing, and $d_a$ is the down range ground plane pixel spacing.

An advantage of the above formulation of the merit function is that it does not rely on an estimate of discriminant slopes, so it is unaffected by errors in the gain slopes of the difference channel or the ground slope in the vicinity of the target 11.

Best fit lines 16 are computed for azimuth and the elevation discriminants to obtain the location of the azimuth and elevation nulls 11 relative to the target 11. Thus, each pixel 12 in the neighborhood of the target cell 11 (window 15) contributes to the estimation of the offset of the difference channel null from the target 11. The offset of the pixel 12a corresponding to the target 11 from the center of the null 14 indicates the amount and the direction of null steering which is commanded to place the null 14 on the target 11. FIG. 2 illustrates the estimation of null position relative the designated position of the target 11.

The use of many pixels 12 in a three-dimensional SAR map 10 improves the null location estimate. With the method 20 of the present invention, estimation accuracy is improved by approximately the square root of the product of the clutter to noise ratio and the number of pixels 12 used in the estimation of the offset of the difference channel null 14. For an example of 120 pixels 12 with a 16 dB clutter-to-noise ratio, the improvement factor is 85. This results in a very small range or cross range RMS error. For a standard azimuth or elevation difference pattern, the discriminant is the real part of the difference to sum ratio. For a funnel pattern, both the real and imaginary parts are formed to obtain the azimuth and elevation discriminants, respectively.

In addition, to further reduce the null pointing errors, the total bandwidth of the illumination waveform should match the SAR bandwidth used in the null estimation waveform. This averages out frequency dependent errors such as radome refraction and beam squinting of the electronically steered array.

For the purposes of completeness, and to summarize the present invention, FIG. 4 is a flow diagram illustrating steps in the present data processing method 20. First, a radar signal is transmitted 21. Then, sum and difference channel SAR maps derived from the transmitted radar signal are formed 22. A target cell 12a within the SAR maps is designated 23, either automatically or by an operator. This step determines the location 23 of a target cell 12a within the current SAR maps. A window surrounding the target cell 12a is defined 24. Discriminant values for each of the cells within the window are computed 25 that comprise the difference channel value divided by the sum channel value for each cell. A best fit line through the computed discriminant values is then computed 26. A null cell where the discriminant value defined by the best fit line is equal to zero is determined 27. Then, the radar signal is steered 28 so that the null cell coincides with the designated target cell 12a.

Thus, an improved beamsplitting technique and data processing method for use with three-dimensional synthetic array radars has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A data processing method for use in processing synthetic array radar data to more accurately steer its antenna toward a target, said method comprising the steps of:

transmitting a radar signal;

forming sum and difference channel synthetic array radar maps derived from the transmitted radar signal;

determining the location of a target cell within current synthetic array radar maps;

defining a window surrounding the target cell;

computing discriminant values for each of the cells within the window that comprise the difference channel value divided by the sum channel value for each cell;

computing a best fit line through the computed discriminant values;

determining a null cell where the discriminant value defined by the best fit line is equal to zero; and steering the radar signal so that the null cell coincides with the designated target cell.

2. A data processing method for use in processing synthetic array radar data to more accurately steer its antenna toward a target, said method comprising the steps of:

transmitting a radar Signal;

forming sum and difference channel synthetic array radar maps derived from the transmitted radar signal;

determining the location of a target cell;

computing discriminant values for cells surrounding the target cell that comprise the difference channel value divided by the sum channel value for each cell;

computing a best fit line through the computed discriminant values;

determining a null cell where the discriminant value defined by the best fit line is equal to zero; and steering the radar signal so that the null cell coincides with the designated target cell.

* * * * *